(12) United States Patent
Slone

(10) Patent No.: US 7,889,975 B2
(45) Date of Patent: Feb. 15, 2011

(54) MEDIA EDITING

(75) Inventor: Derek Slone, Southampton (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 11/418,944

(22) Filed: May 5, 2006
(Under 37 CFR 1.47)

(65) Prior Publication Data

US 2006/0204213 A1    Sep. 14, 2006

Related U.S. Application Data

(63) Continuation of application No. 09/794,290, filed on Feb. 27, 2001, now Pat. No. 7,043,137.

(30) Foreign Application Priority Data

Feb. 29, 2000  (GB) .................................. 0004831.4

(51) Int. Cl.
*H04N 5/93* (2006.01)
*H04N 5/92* (2006.01)

(52) U.S. Cl. ..................... 386/280; 386/286; 386/287; 386/337

(58) Field of Classification Search .................. 386/52, 386/64, 98, 126, E5.009; G9B/20.014, 20.029, G9B/27.012, 27.019, 27.033, 27.05, 27.051
See application file for complete search history.

(56) References Cited

U.S. PATENT DOCUMENTS

| | | | |
|---|---|---|---|
| 5,404,316 A | 4/1995 | Klingler et al. ............. 345/418 |
| 5,537,528 A | 7/1996 | Takahashi et al. ........... 715/512 |
| 5,781,188 A | 7/1998 | Amiot et al. ................ 345/723 |
| 5,905,845 A * | 5/1999 | Okada et al. .................. 386/98 |
| 6,154,600 A | 11/2000 | Newman et al. ............... 386/4 |
| 6,351,765 B1 * | 2/2002 | Pietropaolo et al. ......... 709/218 |
| 6,404,978 B1 | 6/2002 | Abe ............................ 386/55 |
| 6,441,830 B1 | 8/2002 | Duvall et al. ................ 715/716 |
| 6,526,215 B2 * | 2/2003 | Hirai et al. .................... 386/52 |
| 6,542,692 B1 * | 4/2003 | Houskeeper ................. 386/52 |
| 6,621,980 B1 | 9/2003 | Gould et al. .................. 386/69 |
| 6,813,434 B1 * | 11/2004 | Noguchi et al. ............... 386/52 |
| 7,020,381 B1 * | 3/2006 | Kato et al. .................... 386/52 |
| 2002/0044757 A1 * | 4/2002 | Kawamura et al. ............ 386/46 |

FOREIGN PATENT DOCUMENTS

| | | |
|---|---|---|
| EP | 0 687 109 | 12/1995 |
| JP | 2000-353375 | * 12/2000 |

* cited by examiner

*Primary Examiner*—Thai Tran
*Assistant Examiner*—Syed Y Hasan
(74) *Attorney, Agent, or Firm*—Frommer Lawrence & Haug LLP; William S. Frommer; Thomas F. Presson

(57) ABSTRACT

A media editing apparatus for editing media items together to form a media product comprises means for displaying at least two representations of the media items, each representation relating to media items lying within a respective time period with respect to the media product; a user control for adjusting the time period of any one of the at least two representations; and means, responsive to a user adjustment of the time period for a current representation, for adjusting the respective time periods of the other representations so that the time periods for the other representations at least encompass the user-adjusted time period for the current representation.

10 Claims, 9 Drawing Sheets

MEDIA EDITING

This is a Continuation Application of U.S. Ser. No. 09/794,290, filed on Feb. 27, 2001, now U.S. Pat. No. 7,043,137, which is hereby incorporated by reference in its entirety herein. U.S. Ser. No. 09/794,290 claims the benefit of U.K. Application No. 0004831.4, filed Feb. 29, 2000.

BACKGROUND OF THE INVENTION

1. Field of the Invention

The present invention relates to media editing.

2. Description of the Prior Art

A wide range of media editing systems are used during post-production to assemble a media product. During the editing process pre-recorded items are managed and linked together in an appropriate manner to produce an acceptable media product.

Many modern computer or graphical-based editing systems use a reference, often a linear graphical representation of the media product along a so-called timeline, to assist the user when navigating through the media product during assembly. Items within the media product can be located using the timeline and removed or reorganized; alternatively new items can be added until the required configuration has been achieved.

With traditional linear media, such as a video tape, items are arranged in a sequential manner with playback being along a single temporal path. Interactive, multi-path media, such as the Digital Versatile Disk (DVD), allow for decision points and items, arranged in parallel, enable playback along multiple paths. At the time of playback, the viewer may decide, for example, which camera angle to chose for a particular scene, which ending to chose for a film or which certificate version (for example, a certificate indicating that the film is only suitable for adult viewers or that viewing is a matter for parental guidance) of a film to show.

Media products are often viewed for contextual reasons as an overall script or title, decomposed into acts, scenes and shots. With multi-path media, it is also necessary to view the decision points as well as the linear items which join them together. Furthermore, where multiple paths of differing durations may be followed, the traditional timeline reference, although desirable, is difficult to envisage. Accordingly, the functionality required by multi-path editing systems is more demanding than with linear systems. In multi-path editing systems, switching between or adjusting views whilst editing presents a further difficulty for the user to keep track of the potentially complex program structure he is creating.

It is a constant aim to improve the ease of use of editing systems.

SUMMARY OF THE INVENTION

This invention provides a media editing apparatus for editing media items together to form a media product, the apparatus comprising:

means for displaying at least two representations of the media items, each representation relating to media items lying within a respective time period with respect to the media product;

a user control for adjusting the time period of any one of the at least two representations; and means, responsive to a user adjustment of the time period for a current representation, for adjusting the respective time periods of the other representations so that the time periods for the other representations at least encompass the user-adjusted time period for the current representation.

Thus the present invention recognizes that in a media editing system providing multiple views of a media structure potentially having a convergent or divergent arrangement of media items, the user can easily become disoriented while navigating through the structure. In particular, he may adjust one view to show a different part of the structure but forget to adjust the other views to match. This could lead to edit decisions being taken on erroneous information, being information displayed in a view but not corresponding to the view the user is currently working on.

The invention addresses these problems by providing a sympathetic update of other views when the user alters a current (working) view to display a different part of the editable structure. This is preferably done in a user-friendly way with the aim of ensuring that information most useful to a current editing operation is always made available in other views. This can dramatically improve the ease of use of the apparatus.

Further respective aspects and features of the invention are defined in the appended claims.

DESCRIPTION OF THE PREFERRED EMBODIMENTS

Figure 1:
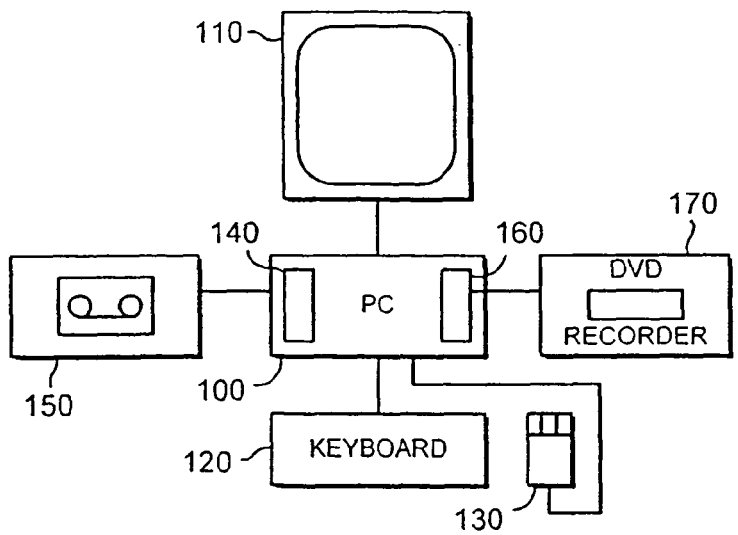
FIG. 1 is a schematic diagram of a digital versatile disc (DVD) authoring system.

FIG. 1 is a schematic diagram of a digital versatile disc (DVD) authoring system. The system is based on a general purpose PC computer 100 having a monitor screen 110, a keyboard 120 and a mouse 130. The PC 100 includes an interface card 140 for interfacing with a video tape recorder 150, e.g. a digital video tape recorder and with other media sources such as audio tape recordings. The PC 100 also includes an interface card 160 for interfacing to a DVD recorder 170 in which data can actually be recorded onto DVD discs for mastering or distribution purposes. Alternatively, the PC could interface to a digital linear tape (DLT) unit to produce a tape master which can later be copied onto DVD disks. The PC 100 runs appropriate software (e.g. carried on a storage medium such as a random access memory, a disk or a read only memory) to carry out the remainder of the functions described in this specification.

Figure 2:
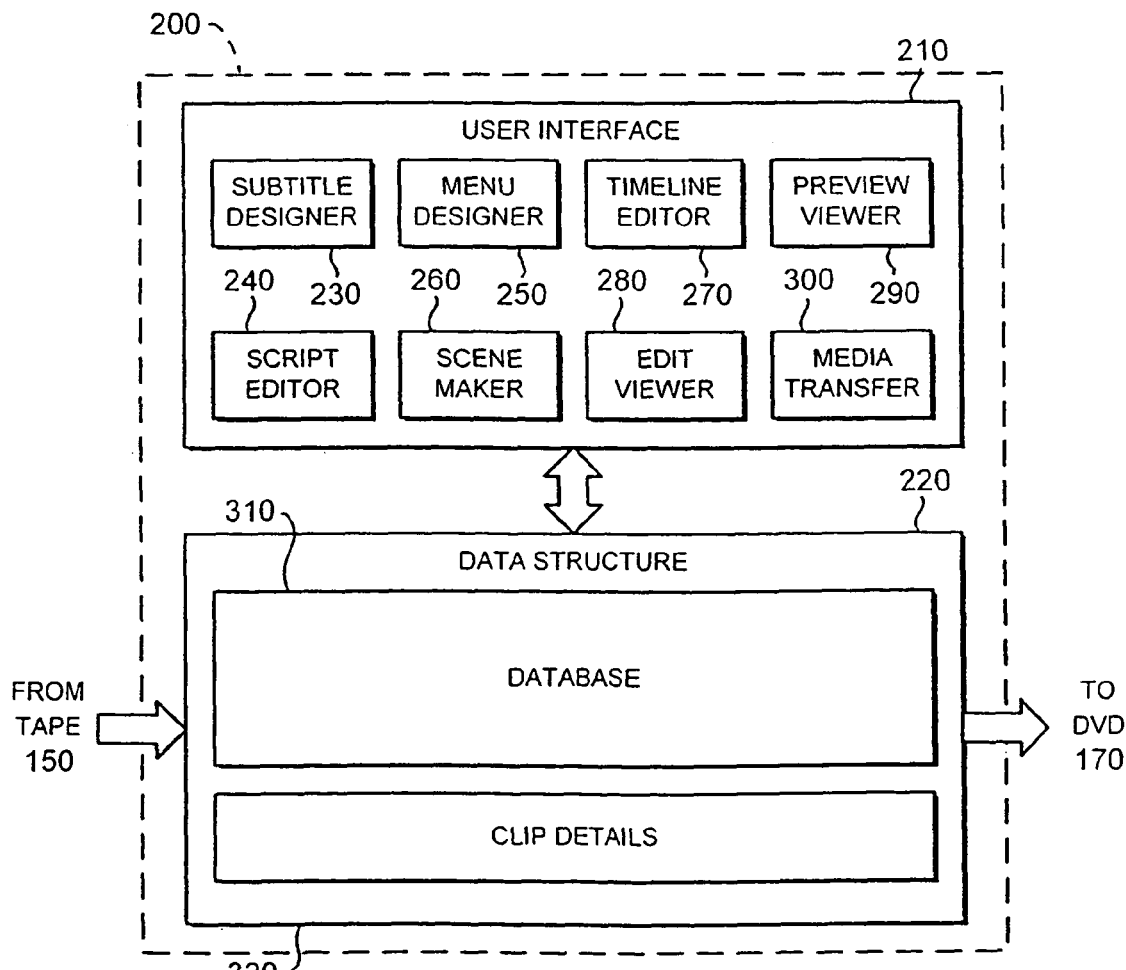
FIG. 2 is a schematic diagram of the logical structure of the system of FIG. 1.

FIG. 2 is a schematic diagram of the logical structure of the system of FIG. 1.

The operation of the PC 100 is represented by a dotted area 200, which subdivides into a user interface 210 and a data structure 220 underlying the user interface.

The user interface comprises a number of sub-functions, namely a sub-title designer 230, a script editor 240, a menu designer 250, a scenario maker 260, a timeline editor 270, an edit viewer 280, a preview viewer 290 and a media transfer controller 300. Many of these will be described below, particular with reference to FIGS. 10 and 11.

The user interface allows input from the user (e.g. via the keyboard 120 or the mouse 130) and controls output to the user for display on the display screen 110. In order to do this, the user interface interacts with the underlying data structure 220. For schematic illustration purposes, the data structure is shown as a meta-database 310 and a function referred to as "clip details" 320. This division represents a separation of the functions of maintaining logical linkages and connections between successive clips to be recorded onto a DVD on the one hand (the meta-database 310) and the function of relating those logical clips to real material stored on the tape 150 or loaded into the storage subsystem in the PC 100 on the other hand. This second function is carried out by the "clip details" unit 320.

Put another way, the clip details function contains information pertaining to sections of real audio/video material that exist on external media and which have been transferred onto the computer's audio/video storage subsystem. It contains so-called thin metadata about and describing these clips. In contrast, the database function contains compositional and topological information about how the clips are sequenced, manipulated and arranged to produce a DVD.

Both of these functions will become clearer in the light of the following description of the nature of a DVD recording.

Figure 3:
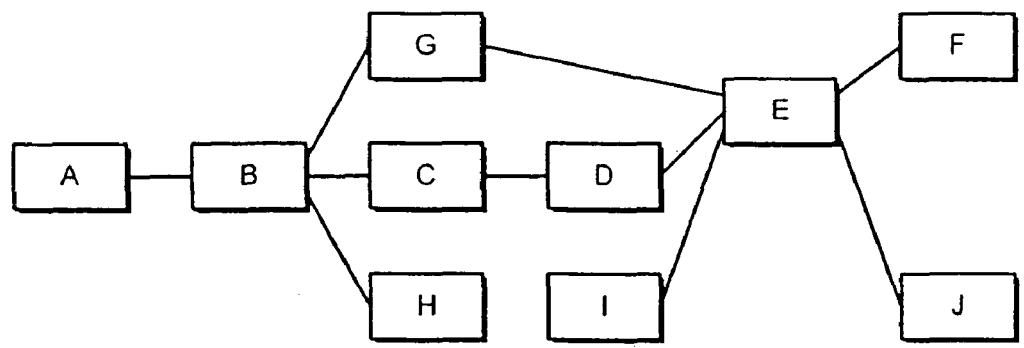
FIG. 3 schematically illustrates an ordered series of scenes in a DVD title.

FIG. 3 is a schematic illustration of a small section of a typical DVD audio/video recording.

The finest level of detail within the database describes how individual clips are composited into "scenes". Scenes are a linear experience that should be thought of in much the same way as scenes in a film script. Multiple play-back experiences are possible when viewing a DVD. Having watched one scene, the viewer may be taken to one of many different scenes depending on the parental settings of the playback device, the selections made from earlier menus, or by making a selection from a menu that is displayed after the scene completes. Thus, a DVD can be described by a directed graph of scenes.

FIG. 3 shows a number of scenes, scenes A to J linked together in an ordered sequence. Running from left to right on FIG. 3 a scene A is displayed first. Scene B then represents a user choice or menu point. In some examples, display might cease at the scene B and await a user input at a screen menu to decide whether to display scene G, scene C or scene H after scene B. In other examples, the user may have pre-selected a route through the choice points on the DVD—for example by selecting a particular "cut" of a film when the film was first loaded.

In any event, only one of scenes G, C and H is displayed after scene B. If scene G is displayed, the next item is a further choice point, scene E. If scene C is displayed, the next item is scene D followed by choice point E. If scene H is displayed, the next item is scene I followed by scene E. As mentioned, scene E is a choice point so the next item to be displayed is either scene F or scene J. This process continues through the whole logical structure of the DVD recording.

So, while this arrangement provides an extremely versatile storage medium, the authoring process to set up and master a disc of this nature can be extremely complicated.

Indeed, the editing process for a traditional linear production is already complicated. With the advent of DVD, another level of complexity is added. Not only must compositional decisions be made, but now topological decisions are also needed. All of the possible paths through the DVD need to be checked for continuity. Appropriate menus must be designed. There is also scope for DVD applications that look nothing like films—for example, catalogues, computer based teaching, quiz games and the like. These would demand even greater flexibility.

Figure 4:
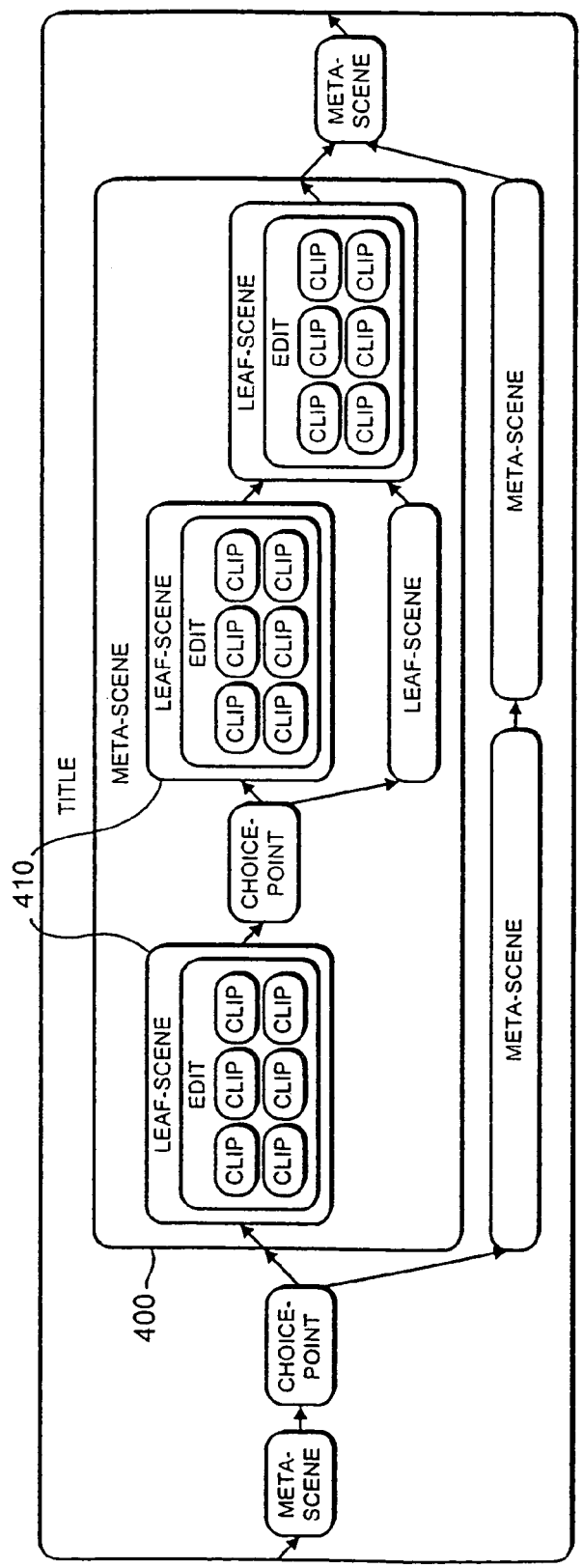
FIG. 4 schematically illustrates a basic arrangement of scenes in the system of FIG. 1.

In order to try to alleviate some of this complexity, in the system of FIG. 1 a hierarchy of scenes is employed. The original scene becomes a "leaf scene" and leaf scenes can in turn be grouped into "meta scenes". Throughout the decomposition, each scene should preferably represent some cohesive concept in the mind of the producer or editor. An example of this hierarchy is illustrated schematically in FIG. 4. In some ways, the arrangement is similar to sub-divisions of a theatrical play. The DVD title corresponds to the whole play. A play is divided into a relatively small number of acts, and these are represented in FIG. 4 by a relatively small number of so-called meta-scenes 400. Again, within each act of a play there are different scenes, and correspondingly a meta-scene in the system of FIG. 1 is sub-divided into (potentially) a plurality of so-called leaf-scenes 410. Each leaf-scene can contain a number of clips. Although the actual choice of clips is left entirely to the user, a convenient way of using the system of FIG. 1 is for a leaf-scene to have a reasonably consistent theme or setting throughout the leaf-scene.

So, in the meta-database 310, details are stored of the way in which the clips are arranged into leaf-scenes, these leaf-scenes are interconnected to form meta-scenes, and the meta-scenes are interconnected to form the DVD title.

However, while it would be possible to store all of these individual connections, in the present embodiments it is recognized that this is not necessarily the most efficient way to store this information, in particular in order that the information may be used and modified when an editing operation is carried out. So, instead of storing the information directly as shown in FIG. 4, a system of so-called maximal length segments (MLS) is used as the storage format. This arrangement is illustrated schematically in FIG. 5.

The basic definition of an MLS is a longest possible contiguous sequence of scenes without any convergence or divergence points within the sequence (i.e. choice points or convergences such as the convergence at scene E in FIG. 3).

Figure 5:
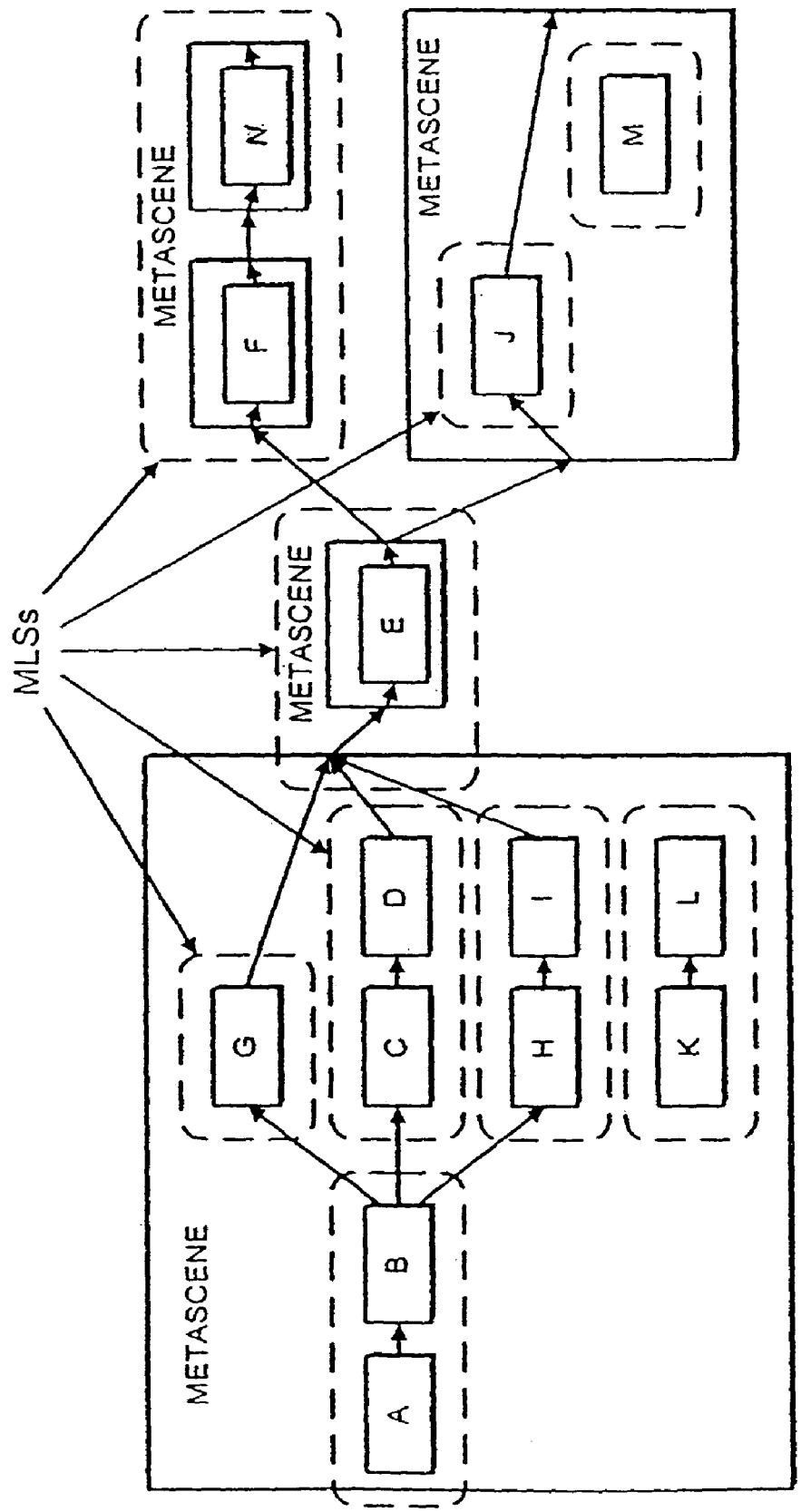
FIG. 5 schematically illustrates so-called maximal length segments (MLSs)

In FIG. 5 an arrangement of meta-scenes and leaf-scenes within those meta-scenes is illustrated. Although the scenes are indicated by letters A . . . M, to avoid any doubt this does not mean that the scenes are identical to those shown in FIG. 3.

From FIG. 5, it can be seen that an MLS could comprise just a single leaf-scene or, towards another extreme, could encompass more than one meta-scene, e.g. the meta-scenes F and N fall within a single MLS. In other words, MLSs thread their way up and down the scene hierarchy. They are not constrained by the extent of any meta-scene.

This arrangement makes skipping through the logical structure of the DVD title very straight forward, and in particular facilitates a feature to be described below, namely a so-called sympathy feature.

The particular way in which MLSs are interlinked, to be described below, facilitates the selection of a consistent "current path" through the DVD. The use of MLSs themselves permits an efficient algorithm for constructing a time based linear rendering of that path, as is required by the timeline editor 270. The MLSs are the means by which a linear timeline visualization, a topological scenario maker visualization and a hierarchical script editor visualization may be bound together within the data model, thus enabling all views to efficiently render their own particular visualization of the information in the underlying data model.

Figure 6:
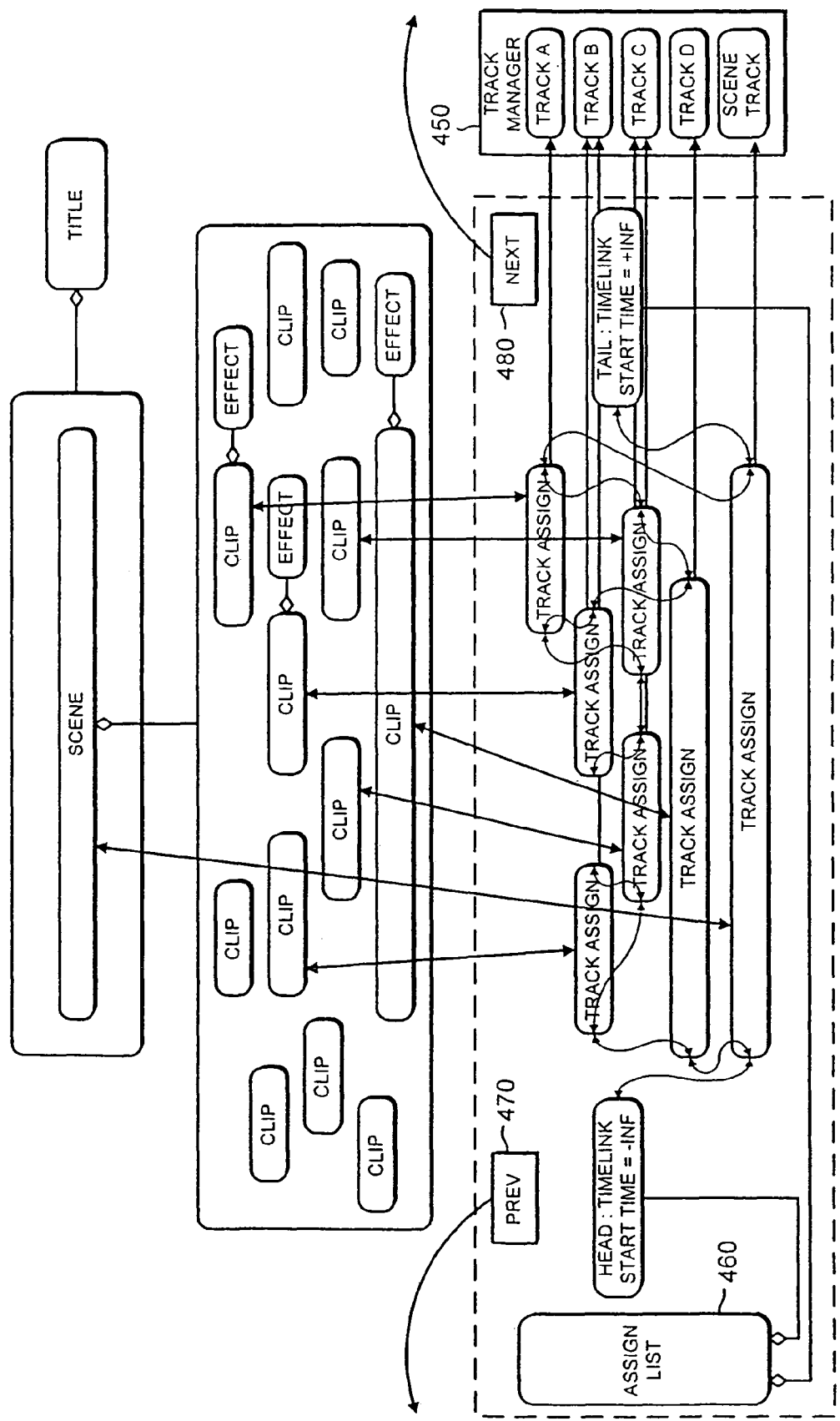
FIG. 6 schematically illustrates the logical structure of an MLS.

FIG. 6 schematically illustrates the logical structure of an MLS in more detail. FIG. 6 also illustrates various points about the logical structure of the data stored in the metadatabase 310.

Before describing FIG. 6, however, the concept of "track assigns" will be explained. If the present system were used in a traditional timeline-based editing system, then each clip would be associated with a respective temporal position on the timeline. That is to say, in a system having no convergences or divergences of path, the clips would occur substantially one after another on the timeline, with a possibility of overlap just for transitional operations such as fades between clips. In traditional applications of this nature, data known as track assignments would logically bind each clip to that position on a particular audio or video track (channel) on the timeline with one track assignment to bind the beginning of the clip to its start position on the timeline, and another to bind the end of that clip to its end position on the timeline.

In the present system the data model must cater for separate timeline fragments, corresponding to MLSs in the above description, which can be linked together in various different sequences. In consequence, there is no one particular starting time that can be given to an MLS—it will be dependent on the particular path that the viewer takes when watching the DVD. SO, an MLS cannot be given a single starting or ending time. However, since the MLS itself is linear, all clips and leaf-scenes within it can be given starting or ending times that are relative to the beginning of the MLS.

In the present arrangement using the MLS structure described earlier, a leaf scene is defined as having a valid start time, or "in point" with respect to the start of the MLS containing that leaf scene. The end time, or "out point" is similarly defined with respect to the start of the MLS. Since MLSs cannot contain path convergences or divergences, these time and track associations remain valid until a change is made to the contents of the MLS, at which time they may need to be reviewed and amended—a process which is set up to happen automatically when an edit is made within an MLS.

So, in FIG. 6, the term "track assign" describes a data item which defines an association with a timeline track or tracks and a start time and end time with respect to the start of that MLS.

The MLS shown in FIG. 6 contains a linked list of such track assigns. The list is linked in the playback order of clips as set by the user. Each track assign shown in FIG. 6 is associated with one of four example video tracks—shown in a track manager unit 450 as tracks A, B, C and D. It can be seen that within the logical structure of the track assigns, different clips may be displayed concurrently via different respective tracks. This is quite normal within a multitrack timeline-based editing system.

Each track assign is logically associated with a respective clip in the clip/scene/title representation of the DVD content described above.

The MLS also contains an assign list 460 which is the anchor identifying starting and ending entries within the doubly-linked list of track assigns within that MLS, pointer 470 to the previous MLS in the current path and a pointer 480 to the next MLS in the current path.

In order to delete a clip or scene from an MLS, the user issues an instruction via the user interface (see below, but basically the instruction is carried out by deleting a screen icon or window associated with the clip or scene to be deleted). The system then deletes the respective track assign from the ordered sequence of track assigns in the appropriate MLS. The track assigns either side of the deleted track assign are then linked together as neighbours. The maximum time variable 490 is reduced appropriately, and the track assign is deleted from the track assign list 460.

To insert a new clip or scene into the MLS, basically the opposite process is carried out. The user issues the instruction via the user interface. A new track assign object is created and new links are created in the MLS to link the new track assign object to its neighbours and to the track manager. The maximum time variable 490 and the track assign list are amended.

Figure 7:
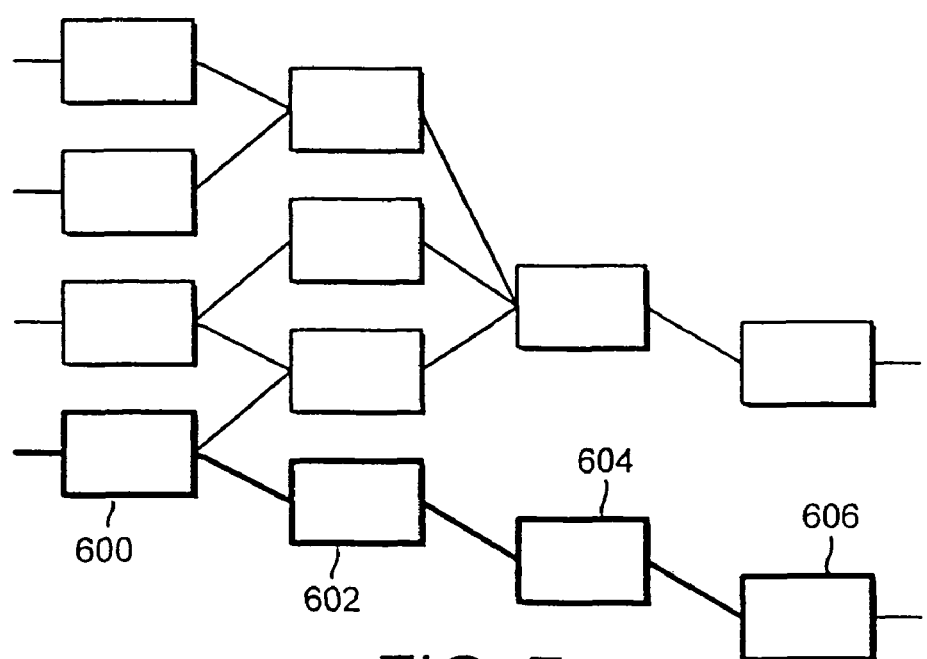
FIGS. 7 to 9 schematically illustrate a search process for re-establishing a current path.
Figure 8:
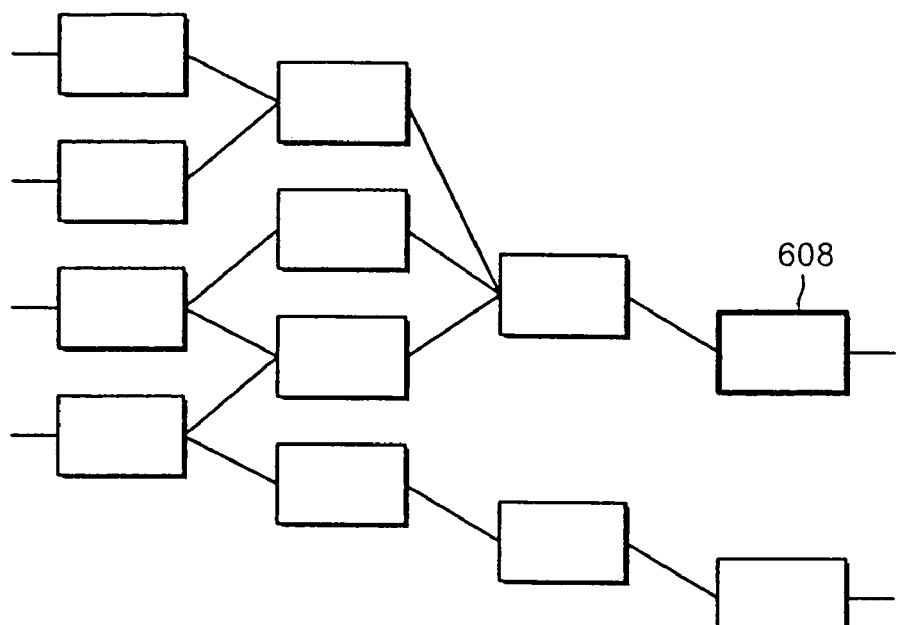
Figure 9:
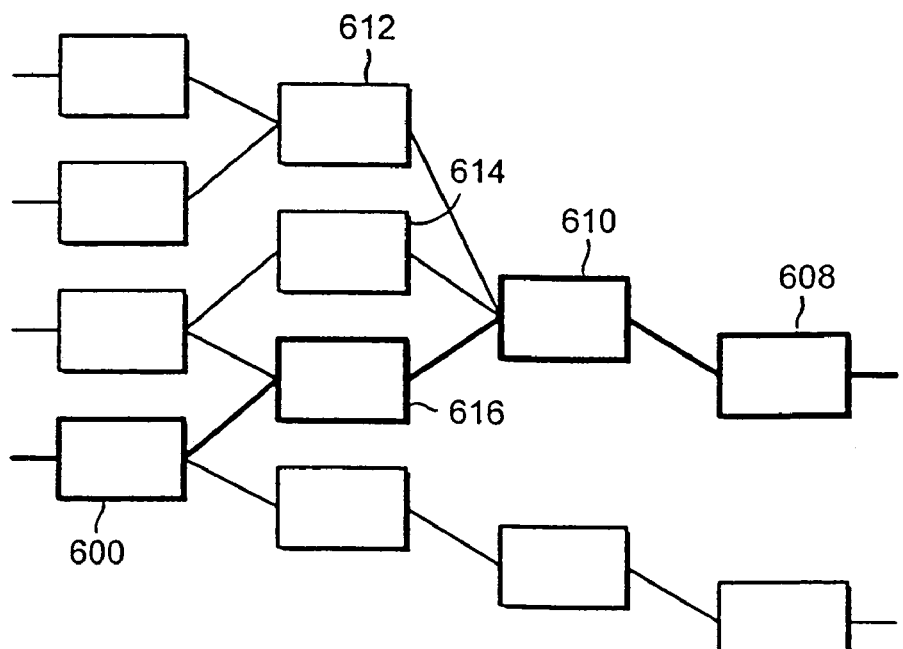

During editing operations on the structure of scenes to be recorded on the DVD, it is useful to define a default or "current" path through the structure. This allows the title to be previewed following along the current path, but more importantly gives meaning to a so-called timeline representation of the title, as a timeline can only refer to one contiguous path through the divergent and convergent structure of the title. FIGS. 7, 8 and 9 schematically illustrate the process carried out when the user instructs a change to the current path. The actual user interface process by which the user can issue such an instruction will be described later.

Referring to FIG. 7, the current path is shown in bold print, and passes through four MLSs 600, 602, 604, 606.

In FIG. 8, the user, via the user interface, instructs that a different MLS, MLS 608, should be included in the current path. Clearly, the "old" current path does not pass through the MLS 608, so some adjustment to the current path is necessary.

The system carries out a process known as a "breadth-first traversal" of MLSs before and after the newly-selected MLS to find a route back to the "old" current path according to a predetermined algorithm. The effect of this process is schematically illustrated in FIG. 9.

FIG. 9 shows the breadth-first traversal process in the reverse time direction. The process also takes place in the forward time direction, but this is omitted for clarity of the diagram.

The idea of breadth-first traversal is that the system first tests all available linkages from the newly-selected MLS to detect whether any of them re-join the "old" current path. If this is not the case, the system then tests all available linkages one MLS removed from the newly-selected MLS, followed by all available linkages two MLSs removed from the newly-selected MLS and so on.

So, in FIG. 9, there is only one linkage in the reverse direction from the MLS 608, leading to the MLS 610. This linkage is therefore adopted as part of the new current path. However, from the linkage 610 there are three reverse linkages, to MLSs 612, 614 and 616. The system tests all of these, but finds that none of the MLSs 612, 614 and 616 fell within the "old" current path. So, the system then tests the two connections from the MLS 612, the single connection from the MLS 614 and finally the two connections from the MLS 616, one of which links back to the MLS 600 which lies within the "old" current path. Accordingly, the MLS 608 has been linked back to the nearest point (in accordance with the defined algorithm) in the old current path.

The links from one MLS to another are maintained in a specific order. The order reflects which links have most recently been on the current path, with the first link indicating that the link was on the current path the last time that the MLS was on the current path. When there are two paths of the same length from the new MLS back to the current path, this specific ordering ensures that the path selected will be the one that was most recently used.

Once the new current path is established, the start times of each MLS within the current path can be calculated and attached to each one. This gives a base starting time for the MLSs within the current path. From this, the start times of leaf-scenes and clips in the current path can be calculated.

Figure 10:
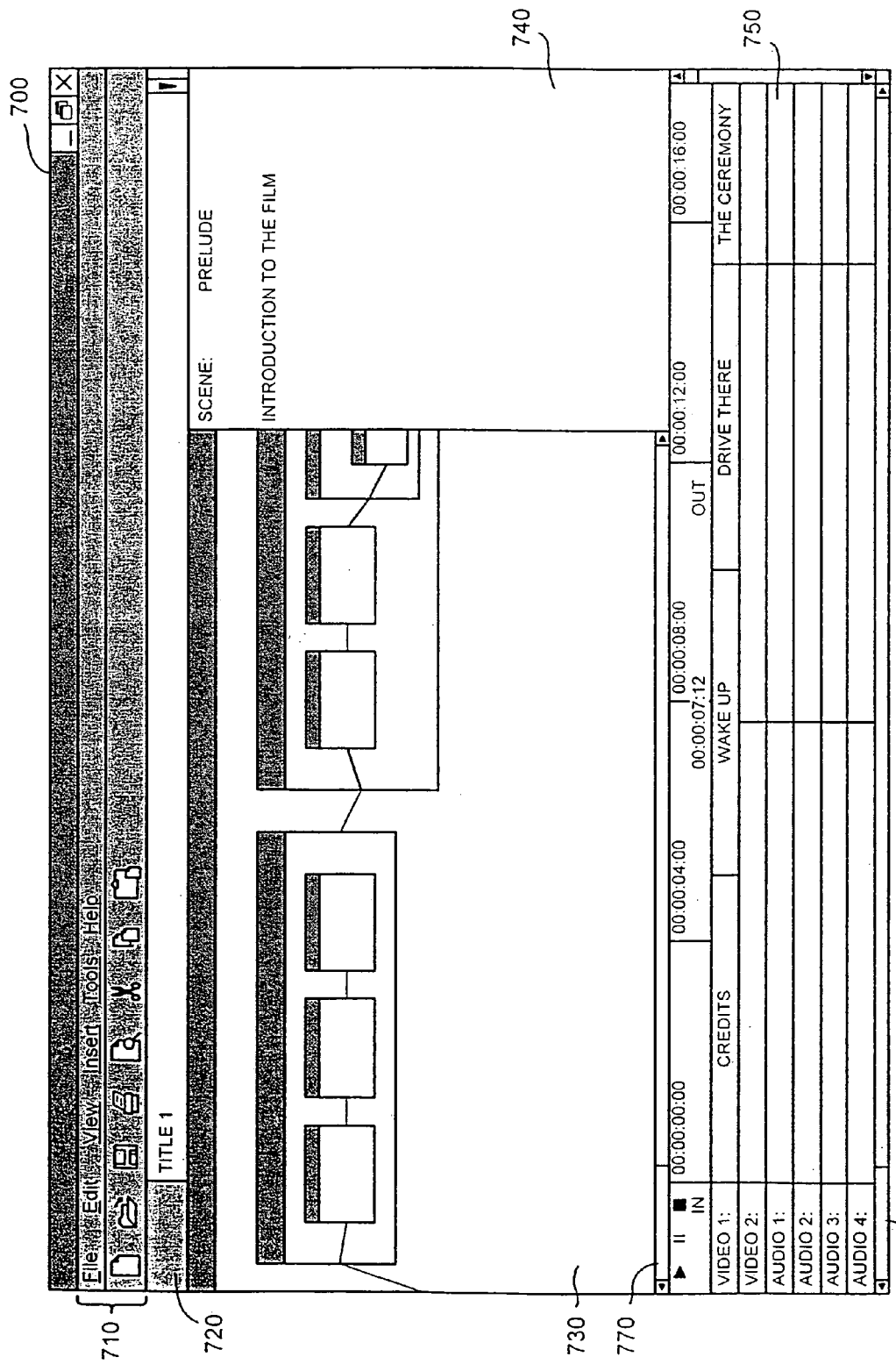
FIG. 10 schematically illustrates a graphical user interface.

FIG. 10 schematically illustrates a user interface screen presented to the user on the display screen 110. The format is in accordance with the Windows 95 operating system. So, a title bar 700 displays the title of the program, in this case, "edit station". Control and button bars 710 provide access to user controls. A current DVD title on which the user is working is displayed in a window section 720.

Three further windows are illustrated. A scenario maker window 730 allows the user, with the aid of the mouse, to link together different screen icons representing leaf-scenes and meta-scenes. A script editor window 740 allows script or sub-titling text associated with the scenes to be edited or viewed. Finally a timeline 750 provides a linear time representation of the route through the DVD title represented by the current path. The timeline 750 shown in FIG. 10 provides two video tracks and four audio tracks. In accordance with known editing systems, various effects can be implemented on the timeline such as a fade from a video clip on one video track to a video clip on another video track, or a mix between audio signals on more than one audio track.

The user can move forwards and backwards within the script or sub-title text on the script editor 740 by scrolling the text in a similar manner to a word processor, e.g. by using a scroll bar (not shown) or up and down arrow keys. Similarly, the user can "zoom" the time range represented by text in the script editor window, for example by operating a user control (not shown) to move to a lower level of displayed detail, whereby only sub-headings within the text are displayed.

Similarly, the user can move within the timeline representation using a scroll bar 760 or right and left arrow keys. The time range, i.e. the difference between the earliest and latest times displayed on the time line, can be "zoomed" in order to display a shorter or a longer range by the user operating a slide control on the screen.

Again, similarly, when the scenario maker window is active, the user can move around within the icon representation of the scenes (only a sub-set of which is currently displayed in the window shown in FIG. 10) using arrow keys or a scroll bar 770. The user can zoom the range of events shown in the scenario maker window by either applying a scaling so that the icons representing the clips and scenes are displayed at a different size, or by operating a control to display a different level of detail—e.g. only to display icons for hierarchy levels from the leaf scenes upwards. (In common with usual Windows systems, all of these user adjustments occur when the relevant window is the active window at that time).

Figure 11:
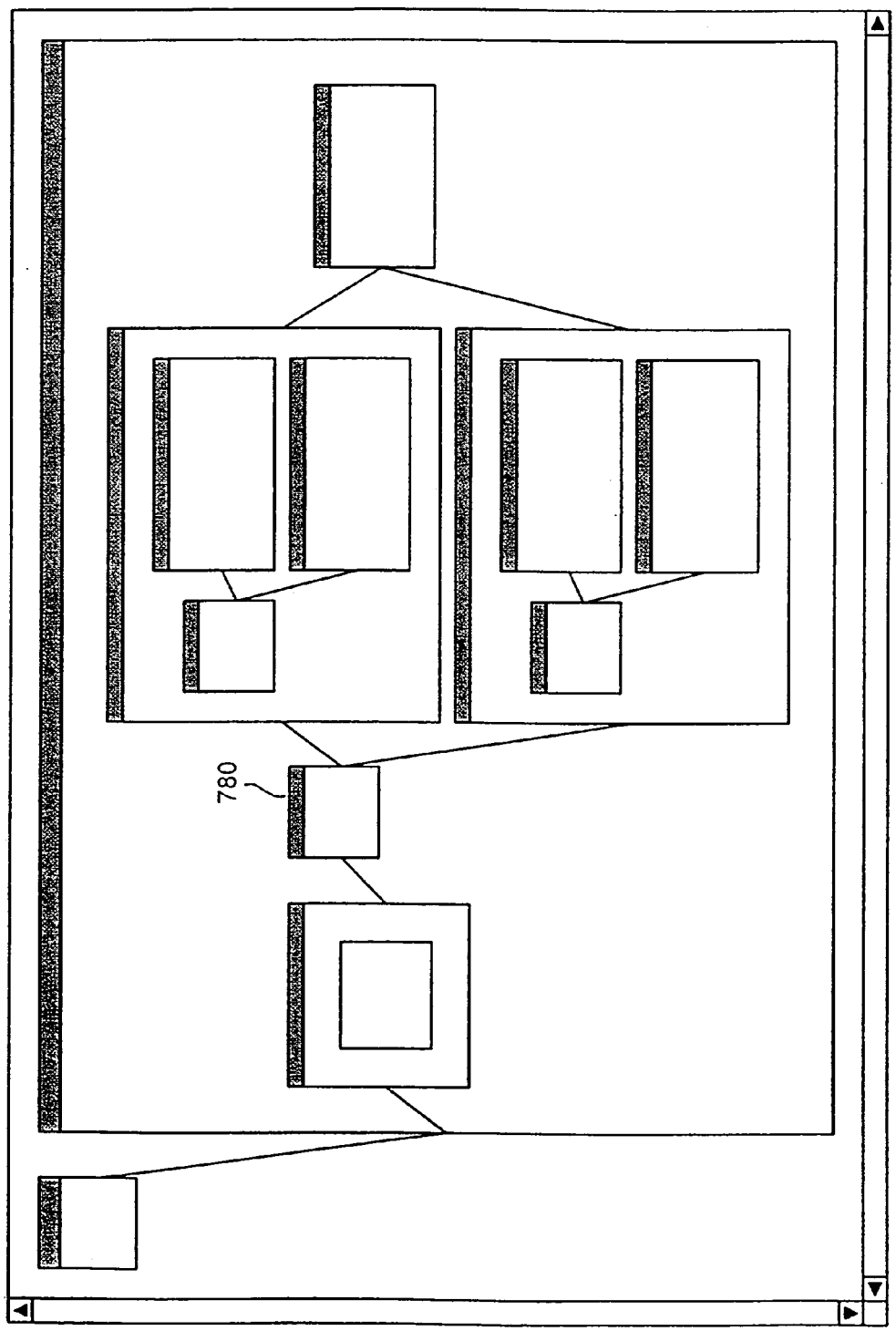
FIG. 11 schematically illustrates an enlarged view of a Scenario maker window.

FIG. 11 illustrates a further example of the scenario maker window. This example illustrates a menu 780, being a list of user options, each option being associated with a link to a subsequent meta-scene.

So, there are at least three windows providing separate respective views of the logical structure of the DVD title being edited. The displayed range in each of these windows can be moved, so as to display details corresponding to a different but similar time range, and zoomed, so as to display a longer or a shorter time range. In the present embodiments it has been recognized that this can lead to potential confusion on the part of the operator, who may believe he is viewing corresponding parts of the title in all the windows when in fact they represent different parts of the title.

In order to alleviate this problem, a feature to be referred to as "sympathy" has been developed for us in the present embodiment. When the operator makes a change to the range or zoom scaling of one of the displayed windows, a corresponding change may be made according to the following set of rules:

(i) If the user adjusts the scenario maker window so as to display a different time range, adjust the position and/or scaling of the time line and script window so that a corresponding time extent is displayed in those windows.

This adjustment is carried out simply by changing the times associated with the left and right extremes (and displayed) of the time line, and also by displaying all text in the script editor associated with the currently displayed scenes (of the current path) in scenario maker.

(ii) If the user adjusts the timeline so as to represent a different time range, adjust the position and or scaling of the scenario maker window so that at least that time range is displayed. Preferably an extra period either side of the timeline range is displayed in the scenario maker window—for example, an extra 10% at either side. Adjust the script window to display the same time range as the time line.

This process requires an assessment to be made by the system of the time extent of the current scenes displayed in scenario maker. This process is made much easier by the use of the MLS structure. The process will be described with reference to FIG. 12.

If the user rescales the scenario maker window, for example by "collapsing" icons so as to display only those icons from a certain hierarchy level upwards, rescale the script window so as to show only those script items (e.g. sub-headings) from that hierarchy level upwards.

Figure 12:
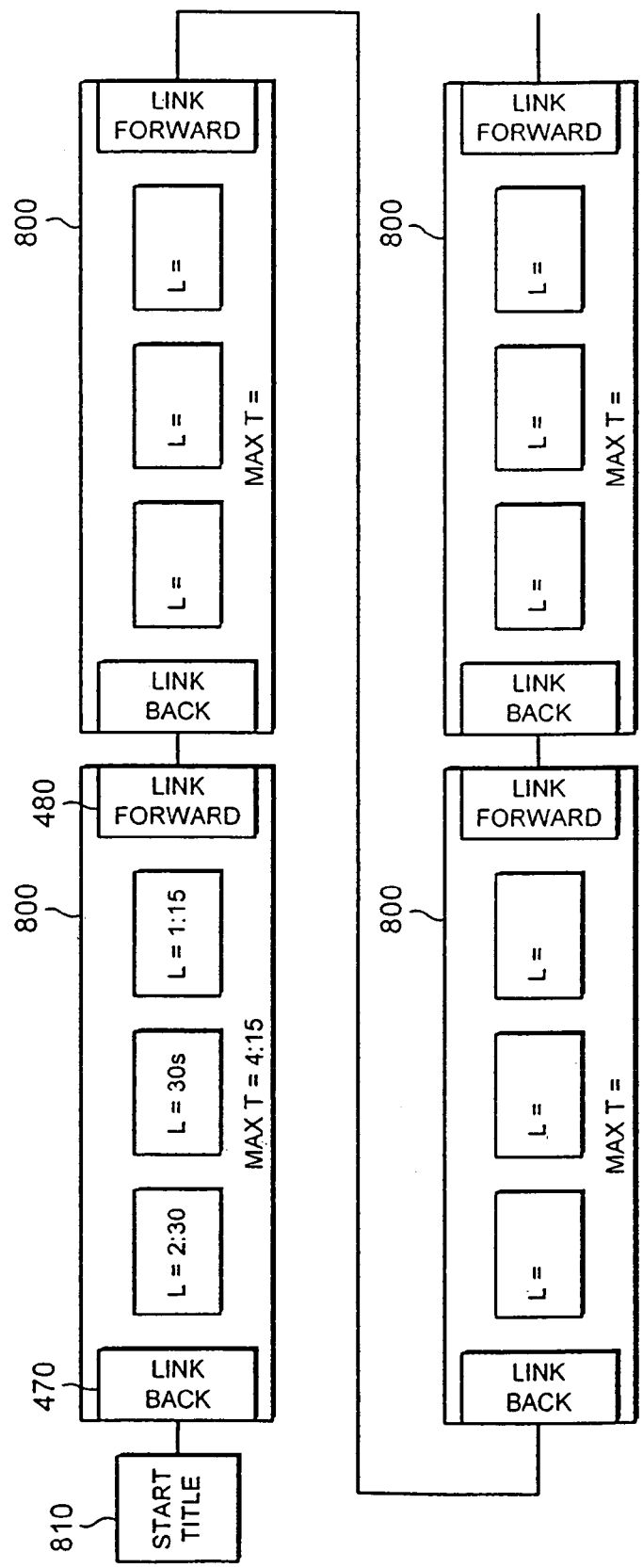
FIG. 12 schematically illustrates a search process for detecting scenes within a required time range.

FIG. 12 schematically illustrates a search process for detecting scenes within a required time range.

Each MLS 800 contains a maximum length of that MLS together with track assigns defining the length of each clip within the MLS. In order to search for MLSs lying within a required time range, a scan is made through successive MLSs along the current path. Starting from time zero (the start of the title 810), the variable "maximum time" from each MLS in the sequence set up by the previous and next links 470, 480 is cumulatively added to detect the first MLS having an end time on or after the start time of the required time range. The search is then continued in the same way to find the next MLS in the sequence with an end time after the end of the required time range.

Once a contiguous set of MLSs encompassing the required time range has been established, a search can be established within the MLSs at each end of that range to find which clips lie within the required time range. So, the length of the first clip is added to the start time of the first MLS in the detected range. If the end of that clip (being the sum of the MLS start time plus the clip length) lies within the required time range then that clip is to be displayed, otherwise, a similar test is performed for the next successive clip and so on. In the same way, the end clip in the time range can be established by adding successive clip times (relative to the start of that MLS) to the start time of the final MLS.

These processes identify two partial MLSs at extremes of the required time range, and zero or more MLSs in-between, enabling the correct clips/scenes to be displayed following a change in the time range of the timeline.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

In so far as the embodiments of the invention described above are implemented, at least in part, using software-controlled data processing apparatus, it will be appreciated that a computer program providing such software control and a storage medium by which such a computer program is stored are envisaged as aspects of the present invention.

I claim:

1. A non-transitory computer-readable storage medium for storing a computer program for organizing an interactive multi-path media, the program comprising:
   a menu design module adapted to receive digital data;
   a display module to simultaneously display at least two representations of the digital data, each representation relating to said digital data lying within a respective time period with respect to a media product comprising said digital data;
   a timeline editor module for adjusting said time period of each of said at least two representations;
   logic, responsive to a user adjustment of said time period for a current representation, for enabling and disabling a sympathy feature,
   wherein said sympathy feature enablement adjusts the respective time period of said other representation to at least encompass said user adjusted time period, and
   wherein said sympathy disablement disables an adjustment of the respective time period of said other representation based on a user adjustment of a view of said current representation;
   an editing module adapted to edit the digital data;
   a previewing module adapted to generate a preview, the preview including edited digital data and clip detail data;
   a storage module adapted to store the clip detail data and the edited digital data,
   wherein interactive path media is organized as a function of the edited digital data and clip detail data.

2. The medium as claimed in claim 1, wherein the clip detail data is accumulated to form scene data.

3. The medium as claimed in claim 1, wherein the storage module stores sequence data related to the clip detail data.

4. The medium as claimed in claim 1, wherein the storage module stores the clip detail data and the edited digital data in a maximal length segments format.

5. The medium as claimed in claim 4, wherein the maximal length segments format is linear.

6. The medium as claimed in claim 1, wherein the editing module is adapted to delete selected portions of the digital data.

7. The medium as claimed in claim 1, wherein the editing module is adapted to define a current path through the digital data.

8. The medium as claimed in claim 1, wherein the editing module is adapted to add sub-title text.

9. The medium as claimed in claim 1, wherein the editing module is adapted to scroll through the digital data.

10. A media editing apparatus for editing media items together to form a media product, the apparatus comprising:
    a menu designer adapted to receive digital data;
    a display to simultaneously display at least two representations of the digital data, each representation relating to said digital data lying within a respective time period with respect to a media product comprising said digital data;
    a timeline editor for adjusting said time period of each of said at least two representations;
    logic, responsive to a user adjustment of said time period for a current representation, for enabling and disabling a sympathy feature,
    wherein said sympathy feature enablement adjusts the respective time period of said other representation to at least encompass said user adjusted time period, and
    wherein said sympathy disablement disables an adjustment of the respective time period of said other representation based on a user adjustment of a view of said current representation;
    a digital data editor for editing the digital data;
    a previewing generator adapted to generate a preview, the preview including edited digital data and clip detail data;
    a computer-readable storage medium adapted to store the clip detail data and the edited digital data;
    wherein interactive path media is organized as a function of the edited digital data and clip detail data.

* * * * *